UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

REGENERATION OR REACTIVATION OF CATALYZERS.

1,412,219.     Specification of Letters Patent.     Patented Apr. 11, 1922.

No Drawing. Application filed March 12, 1918, Serial No. 222,007. Renewed June 28, 1920. Serial No. 392,516.

*To all whom it may concern:*

Be it known that I, WILLIAM D. RICHARDSON, a citizen of the United States, residing at Chicago, in the county of Cook, State of Illinois, have invented certain new and useful Improvements in the Regeneration or Reactivation of Catalyzers; and I do hereby declare the following to be a full, clear, and exact description of the invention, such as will enable others skilled in the art to which it appertains to make and use the same.

This invention relates to the regenerating or reactivating of spent catalyzers, and to the production of regenerated or reactivated catalyzers of high catalytic activity.

The invention is based upon the discovery that spent catalyzers, and particularly metallic catalyzers, for example, nickel catalyzers, made up of finely-divided metallic particles, can be regenerated or reactivated by subjecting the same to a mechanical re-surfacing or reactivating operation.

The invention is of particular importance as applied to the regeneration or rejuvenation of spent nickel catalyzers, made up of finely-divided metallic particles, which are used in hydrogenation processes, for example, the hydrogenation of fatty oils.

It is well known that catalyzers of the kind referred to progressively lose their catalytic activity during use, and that finally, after being used a number of times or for prolonged periods of time, the catalyzers become inert, and no longer perform their proper functions, or perform their catalytic functions so slowly as to be of no practical importance. This is particularly the case where the catalyzer is used with a large quantity of material, and especially if the material worked on is impure or of low grade and contains substantial amounts of those substances which have the effect of "killing" the catalyzer or rendering it partly or completely inactive.

The catalytic action of finely divided metals is generally accepted as due to a surface action, and the more extended the active surface for a given weight of metal, the more active is the catalyzer, generally speaking and other things being equal. For this reason, it has been the common practice to produce the finely-divided metallic catalyzers, for example, nickel catalyzers, by reduction of the metal oxides or of other reducible metal compounds, and it has also been proposed to distribute the catalytically active metals upon carriers of various kinds to further increase the catalytically active surfaces.

It has been customary, when such catalyzers have become spent, or reached the condition of inactivity above referred to, to separate them from the oil or other material with which they have been used, as by sedimentation, filtration or otherwise, and then to recover or regenerate the metallic catalyzers by chemical means, such as solution of the spent metal catalyzers in acid, conversion of the dissolved metal into the form of a reducible metal compound, and reduction thereof by hydrogen at an elevated temperature. Thus, for example, in the case of nickel catalyzers which have been filtered from hardened or hydrogenized oil by means of a filter press, the press cake has been removed from the press and boiled with dilute acids, such as sulfuric or nitric acids, whereby the nickel is converted into nickel sulfate or nitrate, from which the metallic catalyzers can be again formed by reduction in accordance with well-known methods.

I have found that such chemical processes of recovery or regeneration, involving solution, and usually precipitation, and subsequent reduction by hydrogen, are unnecessary, and that the spent catalyzers can be simply and readily regenerated or rejuvenated or reactivated by subjecting them to a simple mechanical treatment whereby the catalyzer particles are re-surfaced, and a high degree of catalytic activity thereby imparted to the spent catalyzers.

According to my invention, the surface film or coating of the catalyzer particles, which has become inactive, is removed to such an extent, or in such a manner, that catalytically active surfaces are restored, so that the catalyzer again becomes active.

It has been commonly considered that the running down of catalyzers is due to changes in the surfaces of the catalyzer particles, due primarily to the combination, with the highly sensitive catalytically active surfaces of the catalyzer, of certain substances which produce catalytically inert compounds. Thus, sulfur and sulfur compounds, as well as compounds of phosphorus and arsenic are, for certain catalyzers, highly active catalyzer poisons; and a very small quantity of such catalyzer poisons may serve to convert a relatively large amount of metallic catalyzers into an inactive condition, for the reason that only a very thin film of inactive compound of the metal is required to render the metallic surface inactive. Thus, in some cases, what appears to be but an infinitesimal amount of catalyzer poison may cause a considerable quantity of the catalyzer to become inactive.

Nevertheless, in so far as I am aware, it has been considered necessary, heretofore, to subject the spent catalyzer to chemical treatment, including the formation from the spent catalyzer of reducible metal compounds and the reduction thereof by hydrogen at elevated temperatures, in order to regenerate the spent catalyzers and make them available for further use.

As compared with such prior processes, which are of a more or less complicated and expensive character, the process of the present invention obviates the necessity for chemical treatment of the spent catalyzers and effects the regeneration or reactivating of the spent catalyzer by the simple and inexpensive treatment thereof, by mechanical means, so that the catalyzer particles are re-surfaced, so to speak, and thereby converted into a state of high catalytic activity. By such a simple mechanical treatment alone, I have found that spent catalyzers, and particularly the so-called metallic catalyzers, such as nickel, can be satisfactorily regenerated or rejuvenated.

The mechanical treatment to which the catalyzers are subjected, according to the present invention, may be of different characters provided the catalyzer particles are freed from their inactive surfaces and provided with fresh surfaces of high catalytic activity. I have found that a particularly advantageous method of regenerating or rejuvenating finely-divided catalyzer particles is to make use of a suitable abrasive, in a finely-divided form, which will rub off mechanically the inactive surface films of the spent catalyzer and impart to the particles fresh surfaces of high activity. This abrasive treatment may be carried out in several different ways, and in such manner as to remove mechanically the inactive surface film and produce the fresh active surfaces without materially wearing down the metallic particles or substantially sub-dividing them; or it can be carried out so that added sub-division of the particles will take place at the same time.

In so far as I am aware the process of the present invention is applicable generally to different kinds of catalyzers which have become inactive or "spent" and particularly to so-called metallic catalyzers, in a finely-divided form, whether produced by mechanical comminution or sub-division, or by chemical reduction or thermal decomposition or otherwise. It is well known that certain so-called metallic catalyzers, produced by reduction with hydrogen, contain considerable amounts of oxygen. So also, catalyzers may become inactive or spent through surface oxidation. Such catalyzers, provided their state of oxidation is not too great, may be regenerated or reactivated according to the present invention. When finely-divided catalyzers are produced by mechanical subdivision, for example, by abrasion, the catalyzer is of a metallic character and substantially free from oxides or sub-oxides, if properly protected from oxidation during its process of production. The process of the present invention is, in so far as I am aware, generally applicable to catalyzers produced by these various methods of procedure, even where the finely divided catalyzer particles approach a colloidal condition.

The invention will be further illustrated by the following more detailed description of a specific application thereof, applied to the production of a regenerated or reactivated spent nickel catalyzer, which has become inactive during the catalytic hydrogenation of fatty oils.

A quantity of the spent nickel catalyzer is taken from the filter-press, in which it has been separated from the major portion of the oil, and is mixed with a sufficient quantity of oil so that the entire mass becomes of fluid consistency. This mass is then introduced into a pebble mill or ball mill, and preferably a mill which is lined with porcelain. The mill is then caused to rotate for a sufficient length of time to bring about the desired removal of inactive surfaces from the catalyzer particles and the production of catalytic surfaces of high activity. The progress of the reaction may be followed by taking samples from time to time and testing them for activity by well known means, such as the carrying out of the reaction for which the catalyzer is intended on a small scale. The period of time required for the restoration of the catalyzer to an active condition will vary with the apparatus utilized and the conditions of use. A period of time as much as one to three hours may be required, and more or less time will in practice be used, according to the size of the ball mill, the charge of the pebbles, the speed of reaction, the nature and amount of the oil or other liquid present, and similar considerations.

The balls employed in the ball mill, as well as the lining thereof, should preferably be of material which will not itself, when abraded, contaminate the catalyzer with objectionable constituents. The mill may advantageously be provided with a porcelain lining and flint or porcelain pebbles may be used therein. Instead of the flint or porcelain pebbles, metallic balls, or rounded nodules may be used, especially of the metal which is being re-surfaced, so that the balls or nodules will be abraded during the same operation, and the re-surfaced catalyzer thereby mixed with fresh amounts of finely-divided abraded catalyzer, produced during the regenerating or rejuvenating treatment.

In order to cause the action to go more rapidly, it is of advantage to introduce into the ball mill a quantity of finely-divided abrasive, such as ground quartz or ground sand, carborundum, aloxite, alundum, or similar materials of about 200 mesh fineness. When such an abrasive is present, it will be contained in the resulting rejuvenated catalyst, unless subsequently removed. Accordingly, the abrasive should be of such a character that it does not prejudice the catalytic reaction and it may advantageously be of a character which will supplement and improve the catalytic reaction. With a finely-divided nickel catalyzer, and a finely-divided abrasive, and particularly when oil is present during the regeneration, the regenerated catalyst will be a suspension of the finely-divided nickel and abrasive in the oil, and will be adapted for use in the form of the suspension for the catalytic hydrogenation of oils.

It is also possible to regenerate or rejuvenate the catalyzer by means of an abrasive alone, without the use of pebbles, but it is more advantageous to use both pebbles and abrasive in the re-surfacing operation.

It is also of advantage to have present, during the regeneration, water or other suitable liquid or fluid medium, and particularly oil, where the catalyzer is to be used in the hydrogenation of oil. The regeneration may, however, take place in the air, or in a gaseous atmosphere, such as an atmosphere of hydrogen which will aid in protecting the catalyzer against oxidation, particularly if the operation is carried out at an elevated temperature.

The process of the present invention may also be carried out in the presence of both the protecting liquid, and of a protecting gas. For example, a finely divided nickel catalyzer may be treated in admixture with oil and in the presence of hydrogen; and such treatment may be carried out at an elevated temperature so that the hydrogen, by its reducing action, may assist in the regeneration or rejuvenation of the catalyzer, or may supplement the mechanical regeneration or rejuvenation thereof, with the result, in some cases, that a catalyzer of still further increased actvity may be produced.

It will be evident, also, that the regeneration or rejuvenation may be carried out in the presence of hydrogen, and in admixture with a fatty oil or other liquid to be hydrogenated, and at a temperature appropriate to the hydrogenation of such liquid; so that hydrogenation of the liquid may take place during the regeneration of rejuvenation of the spent catalyzer.

A ball mill is a particularly advantageous apparatus for the regeneration or rejuvenation of the spent finely divided catalyzers, for the reason that the ball mill operation provides a combined rubbing, squeezing and percussive action, peculiarly adapted for the "re-surfacing" of the spent catalyzer particles and the provision of such particles with fresh surfaces of high catalytic activity. Moreover, when the balls or pebbles are of catalyzer material, for example, metallic nickel, and particularly when a finely-divided abrasive is present, the combined rubbing, squeezing and percussive action of the ball mill operation will conjointly bring about the rejuvenation of the spent catalyzer and the production of notable amounts of fresh catalyzer in a finely divided form, and of a sufficient fineness to adapt it to mix with substantial homogeneity with the particles of the rejuvenated spent catalyzer, so that the composite particles may be utilized, for example, in suspension in a fatty oil for the catalytic hydrogenation thereof.

I claim:

1. The method of regenerating spent catalyzers which comprises resurfacing the same by mechanical means and thereby converting the same into an active catalyzer; substantially as described.

2. The method of regenerating finely divided spent catalyzers which comprises resurfacing the catalyzer particles by mechanical means and thereby converting the same into an active catalyzer; substantially as described.

3. The method of regenerating spent metallic catalyzers which comprises resurfacing the same by mechanical means and thereby converting the same into an active catalyzer; substantially as described.

4. The method of regenerating spent catalyzers which comprises resurfacing the same by abrasion thereof and thereby converting the same into an active catalyzer; substantially as described.

5. The method of regenerating finely divided spent catalyzers which comprises resurfacing the same by attrition in admixture with an abrasive and thereby converting the same into an active catalyzer; substantially as described.

6. The method of regenerating finely divided spent catalyzers which comprises introducing the same into a revolving drum and subjecting the same therein to a combined rubbing, squeezing and percussive action, and thereby converting the same into an active catalyzer; substantially as described.

7. The method of regenerating finely divided spent catalyzers which comprises introducing the same into a revolving drum and subjecting the same therein to a combined rubbing, squeezing and percussive action in admixture with an abrasive, and thereby converting the same into an active catalyzer; substantially as described.

8. The method of regenerating spent catalyzers which comprises resurfacing the same by mechanical means in the presence of a protecting liquid, and thereby converting the same into an active catalyzer; substantially as described.

9. The method of regenerating finely divided spent catalyzers which comprises resurfacing the catalyzer particles by attrition in admixture with an abrasive and a liquid, and thereby converting the same into an active catalyzer; substantially as described.

10. The method of regenerating finely divided spent catalyzers which comprises introducing the same into a revolving drum and subjecting the same therein, in admixture with a liquid, to a combined rubbing, squeezing and percussive action; substantially as described.

11. The method of regenerating finely divided spent catalyzers, which comprises introducing the same into a revolving drum and subjecting the same therein to a ball mill operation, (a combined rubbing, squeezing and percussive action) with metallic balls adapted to furnish added amounts of fresh catalyzer particles, and thereby converting the spent catalyzer into an active catalyzer and at the same time producing additional amounts of fresh catalyzer; substantially as described.

12. The method of regenerating spent nickle catalyzers which comprises resurfacing the same by mechanical means and thereby converting the same into an active nickel catalyzer; substantially as described.

13. The method of regenerating finely divided spent nickle catalyzers which comprises resurfacing the catalyzer particles by mechanical means, and thereby converting the same into an active nickel catalyzer; substantially as described.

14. The method of regenerating finely divided spent nickel catalyzers which comprises resurfacing the same by abrasion thereof and thereby converting the same into an active nickel catalyzer in admixture with the abrasive; substantially as described.

15. The method of regenerating finely divided spent nickel catalyzers which comprises introducing the same into a ball mill and subjecting the same therein to a combined rubbing, squeezing and percussive action and thereby converting the same into an active nickel catalyzer; substantially as described.

16. The method of regenerating finely divided spent nickel catalyzers which comprises introducing the same into a ball mill and subjecting the same therein, in admixture with an abrasive, to a combined rubbing, squeezing and percussive action (a ball mill operation), and thereby converting the same into an active nickel catalyzer in admixture with an abrasive; substantially as described.

17. The method of regenerating finely divided spent catalyzers which comprises subjecting the same to a ball mill operation comprising a combined rubbing, squeezing and percussive action in a ball mill provided with a non-metallic refractory lining, and thereby converting the spent catalyzer into an active catalyzer; substantially as described.

18. The method of regenerating finely divided spent nickel catalyzers which comprises resurfacing the catalytic particles by mechanical means in the presence of a protecting liquid; substantially as described.

19. The method of regenerating finely divided spent nickel catalyzer which comprises subjecting the same to a ball mill operation, comprising a combined rubbing, squeezing and percussive action in admixture with a liquid, and thereby converting the spent catalyzer into an active catalyzer in admixture with the liquid; substantially as described.

20. The method of regenerating finely divided spent nickel catalyzers which comprises subjecting the same to a ball mill operation comprising a combined rubbing, squeezing and percussive action, in admixture with a liquid and an abrasive, and thereby converting the spent catalyzer into an active catalyzer in admixture with the liquid and abrasive; substantially as described.

21. The method of regenerating finely divided spent nickel catalyzer which comprises subjecting the same to a ball mill operation in admixture with oil and thereby converting the spent catalyzer into an active nickel catalyzer in suspension in the oil; substantially as described.

22. A regenerated or reactivated spent catalyzer having mechanically reactivated surfaces; substantially as described.

23. A regenerated or reactivated finely divided spent catalyzer made up of particles having mechanically reactivated surfaces; substantially as described.

24. A regenerated or reactivated spent metallic catalyzer having mechanically reactivated surfaces; substantially as described.

25. A regenerated or reactivated spent catalyzer having catalytically active abraded surfaces; substantially as described.

26. A regenerated or reactivated finely divided spent catalyzer having catalytically active abraded surfaces in admixture with a finely divided abrasive; substantially as described.

27. A regenerated or reactivated spent nickel catalyzer having mechanically reactivated nickel surfaces; substantially as described.

28. A regenerated or reactivated spent nickel catalyzer having catalytically active abraded nickel surfaces; substantially as described.

29. A regenerated or reactivated spent nickel catalyzer having catalytically active abraded surfaces, in admixture with a finely pulverulent abrasive; substantially as described.

30. A regenerated or reactivated finely divided spent nickel catalyzer having mechanically reactivated surfaces, said catalyzer being of such a state of fineness as to adapt it for suspension in an oily vehicle; substantially as described.

31. A regenerated or reactivated spent nickel catalyzer in the form of an oil suspension of catalyzer particles having mechanically reactivated surfaces; substantially as described.

32. A regenerated or reactivated finely divided spent nickel catalyzer in the form of a suspension in oil of catalyzer particles having catalytically active abraded surfaces, in admixture with a finely divided abrasive; substantially as described.

33. A regenerated or reactivated finely divided spent nickel catalyzer having catalytically active abraded surfaces, in admixture with finely divided particles of fresh nickel catalyzer produced during the abrasion; substantially as described.

In testimony whereof I affix my signature.

WILLIAM D. RICHARDSON.